United States Patent
Yu et al.

(10) Patent No.: US 10,461,972 B2
(45) Date of Patent: Oct. 29, 2019

(54) USING MULTI-LEVEL PULSE AMPLITUDE MODULATION WITH PROBABILISTIC SHAPING

(71) Applicant: ZTE Corporation, Shenzhen (CN)

(72) Inventors: Jianjun Yu, Basking Ridge, NJ (US); Hung-Chang Chien, Bridgewater, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/798,305

(22) Filed: Oct. 30, 2017

(65) Prior Publication Data

US 2019/0132164 A1  May 2, 2019

(51) Int. Cl.

| | |
|---|---|
| *H04B 10/60* | (2013.01) |
| *H04L 25/49* | (2006.01) |
| *H04B 10/516* | (2013.01) |
| *H04L 27/34* | (2006.01) |
| *H04L 27/01* | (2006.01) |
| *H04L 27/06* | (2006.01) |

(52) U.S. Cl.
CPC ..... *H04L 25/4917* (2013.01); *H04B 10/5161* (2013.01); *H04B 10/60* (2013.01); *H04L 27/01* (2013.01); *H04L 27/06* (2013.01); *H04L 27/3433* (2013.01)

(58) Field of Classification Search
CPC ..... H04B 10/541; H04B 10/548; H04B 10/60
See application file for complete search history.

(56) References Cited

U.S. PATENT DOCUMENTS

| | | | |
|---|---|---|---|
| 10,073,319 B2* | 9/2018 | Yu | G02F 1/2255 |
| 2003/0016770 A1* | 1/2003 | Trans | H04B 1/00 375/346 |
| 2006/0039498 A1* | 2/2006 | de Figueiredo | H03F 1/3241 375/297 |
| 2008/0273614 A1 | 11/2008 | Heegard et al. | |

(Continued)

OTHER PUBLICATIONS

Böcherer, G., et al., "Opportunities of Probabilistic Shaping for Fiber-Optic Communications", Latin America Optics and Photonics Conference, Medellin, Colombia, Paper LTu2C.5, pp. 1-3, Aug. 2016.

(Continued)

*Primary Examiner* — Dzung D Tran
(74) *Attorney, Agent, or Firm* — Perkins Coie LLP

(57) ABSTRACT

An optical receiver apparatus includes a photo detector that detects amplitude modified optical signals transmitted through an optical transmission channel and mapped to constellation points and converts the optical signal into electrical signals, a sampling circuit that samples the electrical signals and generates digital signals, and a signal processing circuit that has a two-step equalization algorithm converging actual constellation points into desired constellation points. The two-step equalization algorithm includes a first equalization algorithm that uses multiple modulus in performing an error signal calculation, and a second equalization algorithm that includes a filtering procedure that compares actual constellation points with desired constellation points and an adjustment procedure that iteratively adjusts parameters of the filtering procedure in accordance with the comparison result.

17 Claims, 10 Drawing Sheets

(56) References Cited

U.S. PATENT DOCUMENTS

2016/0248540 A1    8/2016    Yu et al.
2018/0262274 A1*  9/2018    Yu ..................... H04B 10/548

OTHER PUBLICATIONS

Dochhan, A., et al., "Solutions for 400 Gbit/s Inter Data Center WDM Transmission," Proceedings of 42nd European Conference on Optical Communication (ECOC 2016), Dusseldorf, Germany, pp. 680-682, Sep. 2016.

Eiselt, N., et al., "First Real-Time 400G PAM-4 Demonstration for Inter-Data Center Transmission over 100 km of SSMF at 1550 nm," Optical Fiber Communication Conference, OSA Technical Digest (online) (Optical Society of America, 2016), Anaheim, California, USA, Paper W1K.5, pp. 1-3, Mar. 2016.

Eriksson, T .A., et al., "56 Gbaud Probabilistically Shaped PAM8 for Data Center Interconnects," European Conference on Optical Communications (ECOC), Göteborg, Sweden, Paper Tu.2.D.4, 99. 1-3, Sep. 2017.

Fehenberger, T., et al., "Sensitivity Gains by Mismatched Probabilistic Shaping for Optical Communication Systems," IEEE Photonics Technology Letters, 28(7):786-789, Apr. 2016.

Gao, Y., et al., "112 Gb/s PAM-4 Using a Directly Modulated Laser with Linear Pre-Compensation and Nonlinear Post-Compensation," Proceedings of 42nd European Conference on Optical Communication (ECOC 2016), Dusseldorf, Germany, pp. 121-123, Sep. 2016.

Li, F., et al., "Demonstration of Four-Channel CWDM 560 Gbit/s 128QAM-OFDM for Optical Inter-Connection," Optical Fiber Communication Conference, OSA Technical Digest (online) (Optical Society of America, 2016), Anaheim, California, USA, Paper W4J.2, pp. 1-3, Mar. 2016.

Li, X., et al., "60-Gbps W-Band 64QAM RoF System with T-spaced DD-LMS Equalization," Optical Fiber Communication Conference, OSA Technical Digest (online) (Optical Society of America, 2017), Los Angeles, California, USA, Paper M3E.2, pp. 1-3, Mar. 2017.

Liu, B., et al., "Performance Comparison of PS Star-16QAM and PS Square-shaped 16QAM (Square-16QAM)," IEEE Photonics Journal, 9(6):7907408(1-9), Oct. 2017.

Liu, B., et al., "Probabilistic shaping for ROF system with heterodyne coherent detection," APL Photonics, 2(5)056104 (1-11), May 2017.

Pang, X., et al., "Evaluation of High-Speed EML-based IM/DD links with PAM Modulations and Low-Complexity Equalization", Proceedings of 42nd European Conference on Optical Communication (ECOC 2016), Dusseldorf, Germany, pp. 872-874, Sep. 2016.

Sadot, D., et al., "Single channel 112Gbit/sec PAM4 at 56Gbaud with digital signal processing for data centers applications," Optics Express, 23(2):991-997, Jan. 2015.

Shi, J., et al., "200-Gbps DFT-S OFDM Using DD-MZM-Based Twin-SSB With a MIMO-Volterra Equalizer," IEEE Photonics Technology Letters, 29(14):1183-1186, Jul. 2017.

Yankov, M.P., et al., "Constellation Shaping for Fiber-Optic Channels With QAM and High Spectral Efficiency," IEEE Photonics Technology Letters, 26(23):2407-2410, Dec. 2014.

Zhang, J., et al., "EML-based IM/DD 400G (4x112.5-Gbit/s) PAM-4 over 80km SSMF Based on Linear Pre-Equalization and Nonlinear LUT Pre-Distortion for Inter-DCI Applications," Optical Fiber Communication Conference, OSA Technical Digest (online) (Optical Society of America, 2017), Los Angeles, California, USA, Paper W4I.4, pp. 1-3, Mar. 2017.

Zhou, X., et al., "Cascaded two-modulus algorithm for blind polarization demultiplexing of 114-Gb/s PDM-8-QAM optical signals," Optical Fiber Communication Conference and National Fiber Optic Engineers Conference, OSA Technical Digest (CD) (Optical Society of America, 2009), San Diego, California, USA, Paper OWG3, pp. 1-3, Mar. 2009.

Gou, P., et al., "Nonlinear Look-Up Table Predistortion and Chromatic Dispersion Precompensation for IM/DD PAM-4 Transmission," IEEE Photonics Journal, 9(5):7203307(1-7), Oct. 2017.

International Search Report and Written Opinion dated Jan. 31, 2019 for International Application No. PCT/CN2018/112670, filed Oct. 30, 2018 (7 pages).

Sun, L., et al., "Probabilistic shaping for 56-Gbps PAM-4 signalling over 8-GHz-bandwidth VCSEL-modulated optical interconnection links," Asia Communications and Photonics Conference, OSA Technical Digest (online) (Optical Society of America, 2017), Guangzhou, Guangdong, China, Paper M2G.6, pp. 1-3, Jan. 2017.

\* cited by examiner

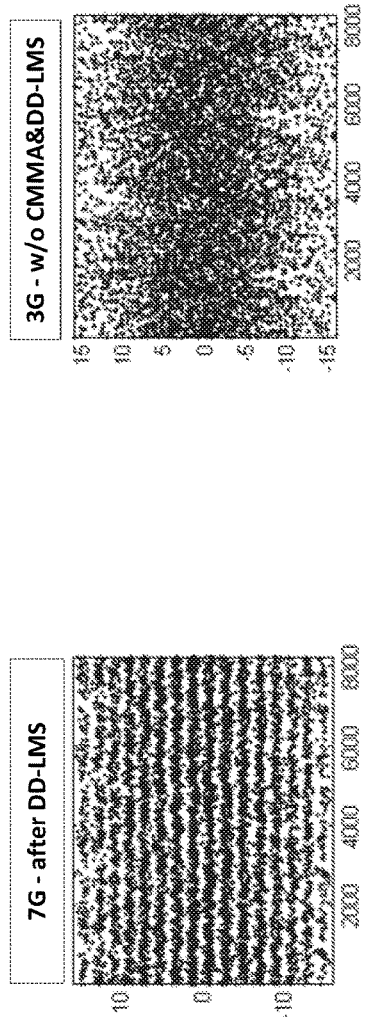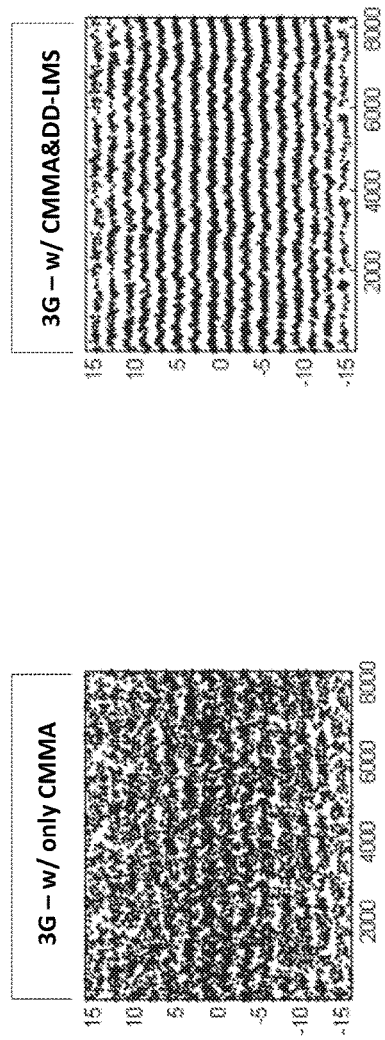
FIG. 9B
FIG. 9D
FIG. 9A
FIG. 9C

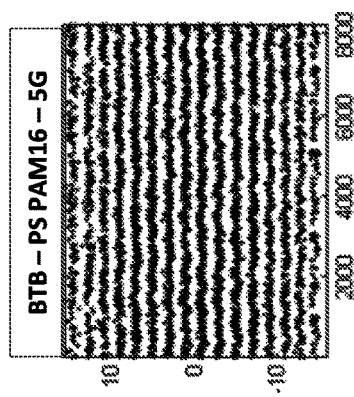
FIG. 11A
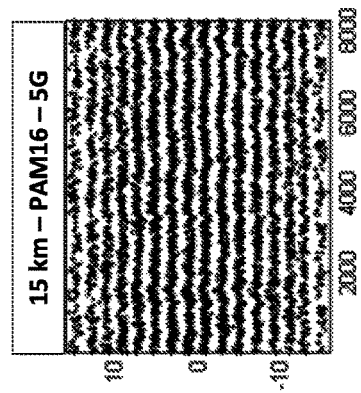
FIG. 11B
FIG. 11C
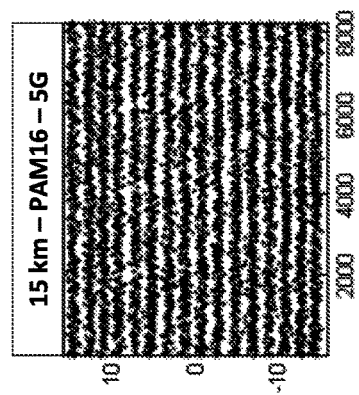
FIG. 11D

USING MULTI-LEVEL PULSE AMPLITUDE MODULATION WITH PROBABILISTIC SHAPING

TECHNICAL FIELD

This document relates to optical communication systems.

BACKGROUND

In an optical communication, pulse-amplitude modulation (PAM) encodes information in the amplitude of a series of optical signal pulse. With the increasing demand for more efficient ways to transmit optical signals, some optical networks use multi-level PAM such as PAM-8, 16, 32 or higher, which can have multiple distinct amplitude levels. Optical devices that employ such a high-order PAM, however, may exhibit nonlinear effects or saturation effects, which lead to a degradation of the quality of the optical signal.

SUMMARY

The present document discloses, among other things, techniques for improving the spectral efficiency of optical systems by using probabilistic shaping in the multi-level pulse amplitude modulation. In another advantageous aspect, the transmitted probabilistically shaped signal can be processed by a receiver using a two-step equalization algorithm converging actual constellation points into desired constellation points, thereby improving the overall performance of optical systems.

In one example aspect, an optical receiver apparatus includes a photo detector that detects amplitude modified optical signals transmitted through an optical transmission channel and mapped to constellation points and converts the optical signal into electrical signals, a sampling circuit that samples the electrical signals and generates digital signals, and a signal processing circuit that has a two-step equalization algorithm converging actual constellation points into desired constellation points. The two-step equalization algorithm includes a first equalization algorithm that uses multiple modulus in performing an error signal calculation, and a second equalization algorithm that includes a filtering procedure that compares actual constellation points with desired constellation points and an adjustment procedure that iteratively adjusts parameters of the filtering procedure in accordance with the comparison result.

In another example aspect, an optical communication system includes, at a transmitter side, a light source that generates a light wave as an optical carrier wave, and a modulation signal generator that produce information bits to be transferred in a form of an optical multi-level pulse amplitude modulation signal using a probabilistic shaping scheme. The optical communication system includes, at a receiver side, an optical signal receiving circuit that detects the optical multi-level pulse amplitude modulation signal mapped to constellation points and converts the optical signal into electrical signals, a signal processing circuit that has a two-step equalization algorithm converging actual constellation points into desired constellation points. The two-step equalization algorithm includes a first equalization algorithm that uses multiple modulus in performing an error signal calculation, and a second equalization algorithm that includes a filtering procedure that compares actual constellation points with desired constellation points and an adjustment procedure that iteratively adjusts parameters of the filtering procedure in accordance with the comparison result.

In another example aspect, a method of recovering information bits from a probabilistically shaped (PS), multi-level pulse amplitude modulation (PAM) optical signals includes receiving the PS multi-level PAM optical signal mapped to constellation points, converting the optical signal into an electrical signal, and processing the converted electrical signal using a two-step equalization algorithm converging actual constellation points into desired constellation points, at the receiver side. The two-step equalization algorithm includes a first equalization algorithm that uses multiple modulus in performing an error signal calculation, and a second equalization algorithm that includes a filtering procedure that compares actual constellation points with desired constellation points and an adjustment procedure that iteratively adjusts parameters of the filtering procedure in accordance with the comparison result.

These and other aspects, and their implementations and variations are set forth in the drawings, the description and the claims.

BRIEF DESCRIPTION OF THE DRAWINGS

FIGS. 9A-9D illustrate example signal constellations in different circumstances.

FIGS. 11A-11D illustrate corresponding example constellations at 5 Gbaud-rate.

DETAILED DESCRIPTION

With the increasing demand for high data communication bandwidth, multi-level pulse amplitude modulation (PAM) has gained attention in recent years. Pulse-amplitude modulation (PAM) is a form of signal modulation where information is encoded in the amplitude of a series of signal pulse such as an optical wave. A Mach-Zehnder modulator (MZM) is used for controlling the amplitude of the optical wave. In a system where intensity-modulation and direct-detection (IM-DD) is implemented based on the MZM, multi-level PAM such as PAM-4, PAM-8, and PAM-16 can be an effective modulation scheme because of its low complexity, low cost, low power consumption, and good noise tolerance. PAM-4 has been standardized in IEEE P802.3bs and can be used in EML-based IM-DD 4×112.5-Gbit/s transmission over 80 km single mode optical fiber. Several 100 Gb/s per lane short-range fiber-optical transmission experiments based on PAM-4 or PAM-8 have been conducted. In addition, PAM-16 can offer higher spectral efficiency and satisfactory reliable performance at the same time, compared with PAM-4 and PAM-8.

Probabilistic shaping is a method of altering the distribution of signal points across the constellation space by varying the individual probability of occurrence of the signal points. Such a nonuniform distribution as the probabilistic shaping can provide better noise tolerance and higher transmission capacity for optical fiber communication systems and enable communication at a lower required signal-to-noise ratio (SNR). A probabilistically shaped multi-level PAM signal mapped to constellation points in a nonuniform manner, however, requires a receiver apparatus to perform an optimized equalization algorithm in order to obtain a better bit-error-rate (BER) performance.

Figure 1:
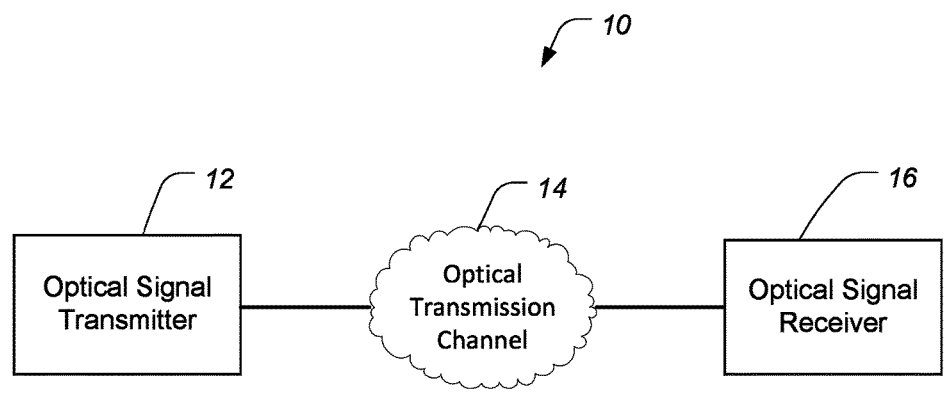
FIG. 1 illustrates an example optical communication network.

FIG. 1 illustrates an example optical communication network 10 in which an optical signal transmitter 12 and an optical signal receiver 16 communicate with each other via an optical transmission channel 14. The optical signal transmitter 12 may include circuitry configured to convert electrical input signals to optical signals. The optical transmission channel 14 may include optical fibers that extend in length from several hundred feet (e.g., last mile drop) to several thousands of kilometers (e.g., long haul networks). The optical signals that have passed the optical transmission channel 14 may be transmitted through intermediate optical equipment such as amplifiers, repeaters, switches, etc., which are not shown in FIG. 1 for clarity. The optical signal receiver 16 may include circuitry configured to perform the actual reception of the optical signals and convert the optical signals into electrical signals.

In some implementations, the optical signal transmitter 12 may generate probabilistically shaped (PS), multi-level PAM optical signals at a high baud rate based on IM-DD and send the signals over an optical fiber. For example, the optical signal transmitter 12 may provide 7 Gbaud PS PAM-16 intensity modulated direct detection (IM-DD) optical transmission over 15-km fiber. The optical signal receiver 16 may include digital signal processing (DSP) circuitry including cascaded multi-modulus algorithm (CMMA) and decision-directed least mean square (DD-LMS) algorithm to improve bit error rate (BER) performance.

Figure 2:
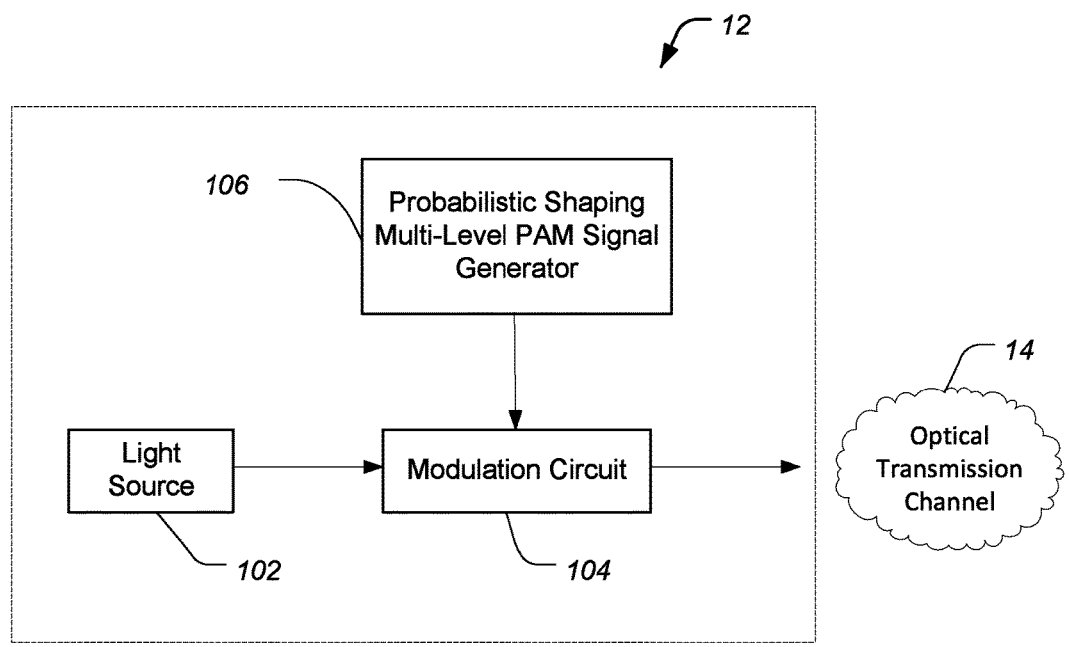
FIG. 2 illustrates an example optical signal transmitter.

FIG. 2 illustrates an example optical signal transmitter 12 in which a light wave is modulated by electrical PS multi-level PAM signal. In an implementation, the optical signal transmitter 12 includes a light source 102, a modulation circuit 104, and a probabilistic shaping multi-level PAM signal generator 106. The light source 102 may include an external cavity laser (ECL) that generates a continuous-wave (CW) light wave, for example, at 193.1080 THz. Then the CW light wave is modulated by electrical PS multi-level PAM signal at the modulation circuit 104. The modulation circuit 104 is used for controlling the amplitude of the light wave. In an implementation, the modulation circuit 104 may be a Mach-Zehnder modulator (MZM). For example, the CW light wave passes through a MZM and is modulated by a 2~7 Gbaud electrical PS PAM-16 signal. Here, the electrical PS multi-level PAM signal may be generated using a mapping from data bits to pulse amplitudes. For example, in experimental simulations, the inventors performed this function using a built-in function from a Matlab programming.

The resulting signal is then converted from digital to analog by an arbitrary waveform generator (AWG). For example, the AWG has a maximal sampling rate of 12 GSa/s and 3 dB bandwidth of 3.6 GHz, and the MZM has a bandwidth of 40 GHz and a peak-to-peak driving voltage of 2.009 V. In some implementations, the optical signal transmitter 12 may further include an attenuator after the modulation circuit 104. After the attenuator, the PS PAM-16 optical signal is launched into the optical fiber, e.g., a SMF-28 fiber with a launch optical power of around −2.1 dBm.

Figure 3B:
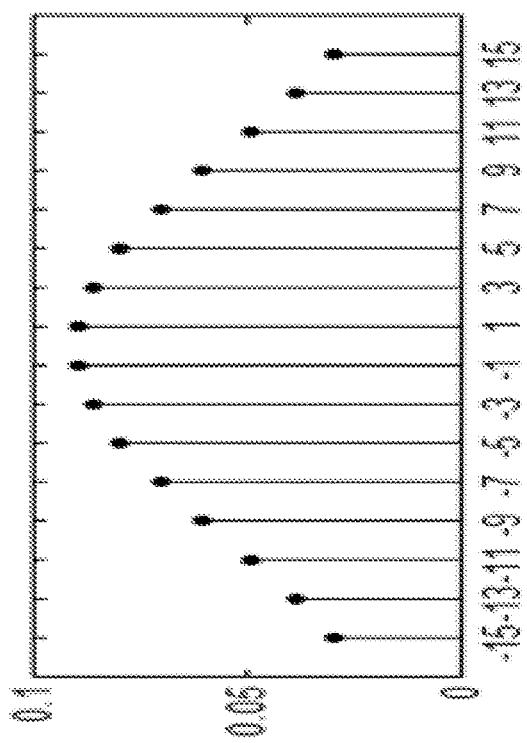
FIGS. 3A-3B illustrate the probabilities of signal points for uniform and PS PAM-16, respectively.
Figure 3A:
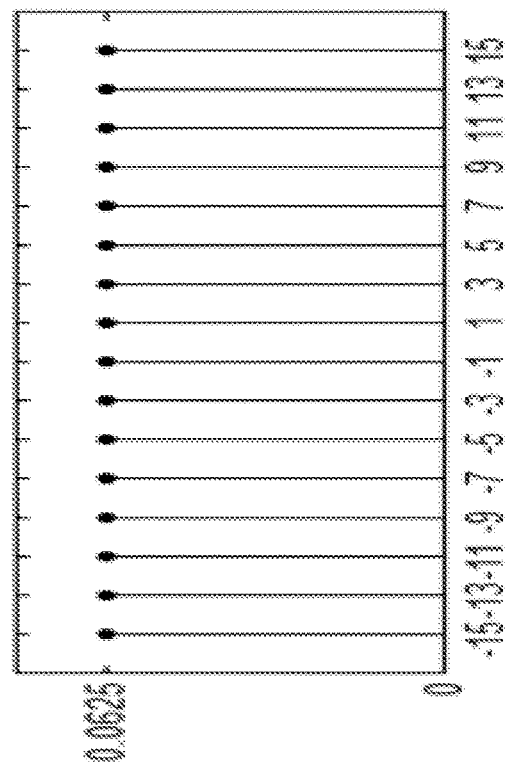

FIGS. 3A-3B illustrate the probabilities of signal points for uniform and PS PAM-16, respectively. PS PAM-16 improves the probability of constellation points with smaller amplitude but cut down the probability of points with larger amplitude who are the most prone to cause bit-error. The detailed probability of each constellation can be expressed as:

$$P_X(x_i) = \frac{1}{\sum_{k=1}^{M} e^{-vx_k^2}} e^{-vx_i^2}. \qquad \text{Eq. (1)}$$

where the parameter v is 0.005 and pulse-amplitude modulation (PAM) level distribution for PS PAM-16 is [0.0582, 0.0770, 0.0978, 0.1194, 0.1402, 0.1580, 0.1712, 0.1782]. Other values of the parameter v may also be used. For example, the value of v may be between 0.002 and 0.007. In this way, the highest achievable information rate (AIR) can reach 3.9149 bit/symbol and the average power of PAM signals will be converted from 85 dB to 60 dB. Thus, Euclidean distance of PS PAM-16 can get 1.19 times improvement compared with uniform PAM-16. At the same time, the probability of high-amplitude constellation points with worse BER performance is decreased.

Figure 4:
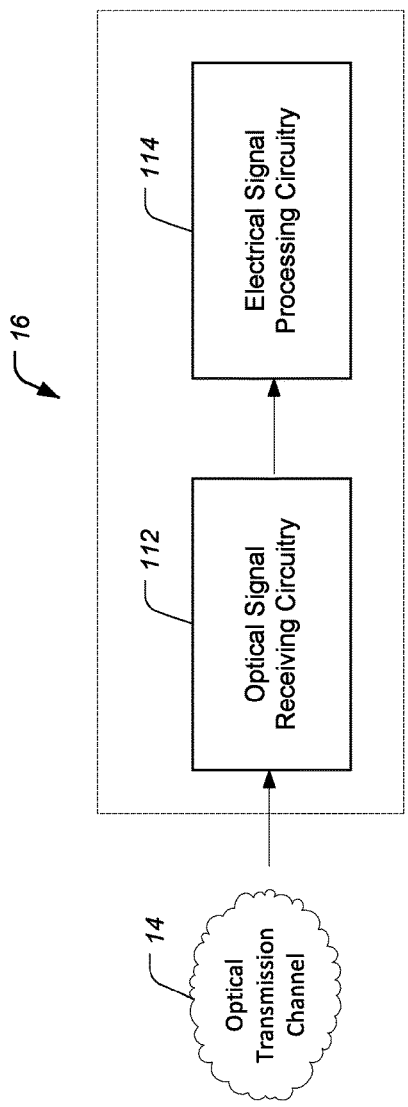
FIG. 4 illustrates an example optical signal receiver.

FIG. 4 illustrates an example optical signal receiver 16, which detects the optical signal and converts the optical signal into digital signals. In some implementations, the optical signal receiver 16 may include optical signal receiving circuitry 112 and electrical signal processing circuitry 114. The optical signal receiving circuitry 112 detects the optical signal transmitted through the optical transmission channel 14 and converts the optical signal into digital signals, and the electrical signal processing circuitry 114 performs a two-step equalization algorithm to accomplish better BER performance. This two-step equalization algorithm includes an equalization algorithm that converges constellation points to a range within which a secondary equalization algorithm can cover. The secondary equalization algorithm further converges the constellation points.

Figure 5:
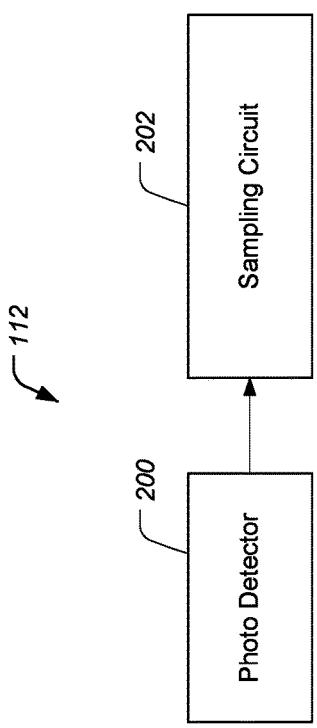
FIG. 5 illustrates an example of optical signal receiving circuitry.

FIG. 5 illustrates an example of optical signal receiving circuitry 112, which detects the optical signal. In some embodiments, the optical signal receiving circuitry 112 may include a photo detector 200 and a sampling circuit 202. The photo detector 200 detects the optical signal that passes through the optical transmission channel 14 and converts the optical signal into an electrical signal, and the waveform of the optical signal is then captured and sampled by the sampling circuit 202. In some implementations, the photo detector 200 may be a photo-diode. For example, in a communication circumstance where the optical signal travels over 15 km fiber and then is transmitted to the optical signal receiving circuitry 112, a photo-detector with a 3 dB bandwidth of 15 GHz is used to receive the optical signal with an input optical power of −4.7 dBm and converts it into an electrical signal. Subsequently, the sampling circuit 202 may convert the electrical signal into a digital signal. In an implementation, e.g., for experimentally testing the effectiveness, the sampling circuit 202 may be included in an oscilloscope. For example, electrical signals are converted into digital signals with the sample rate of 50 GSa/s by an oscilloscope with 33 GHz bandwidth.

Figure 6:
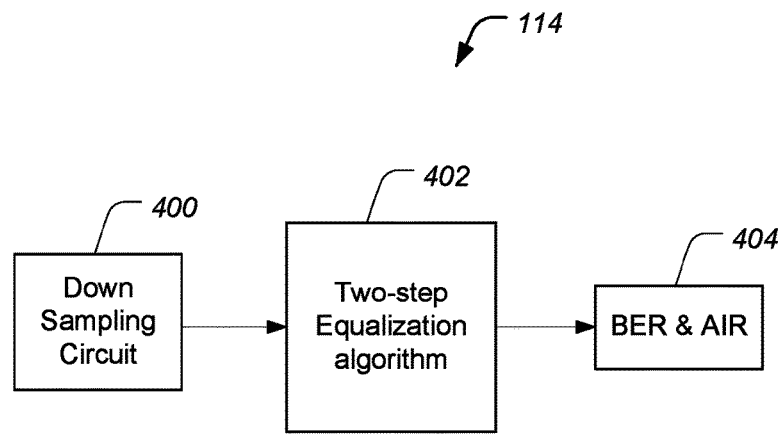
FIG. 6 illustrates an example of electrical signal processing circuitry.

FIG. 6 illustrates an example of electrical signal processing circuitry 114 in which the converted digital signals are processed by using a two-step equalization algorithm. In an embodiment, the electrical signal processing circuitry 114 includes a down sampling circuit 400, an implementation of a two-step equalization algorithm 402, and optionally a BER and AIR counting circuit 404. In an implementation, the electrical signal processing circuitry 114 may be an offline digital signal progressing (DSP) device that includes circuitry performing down-sampling, equalization algorithm, and BER and AIR counting. The equalization algorithm may be performed in a way that converges constellation points to a certain range first and further converges the converged constellation points. After performing the equalization algorithm, the bit-error ratio (BER) and achievable information rate (AIR) can also be obtained. After the down sampling and before the BER and AIR counting, a decision process and a PAM-16 demodulation (not illustrated) may be further performed.

Figure 7:
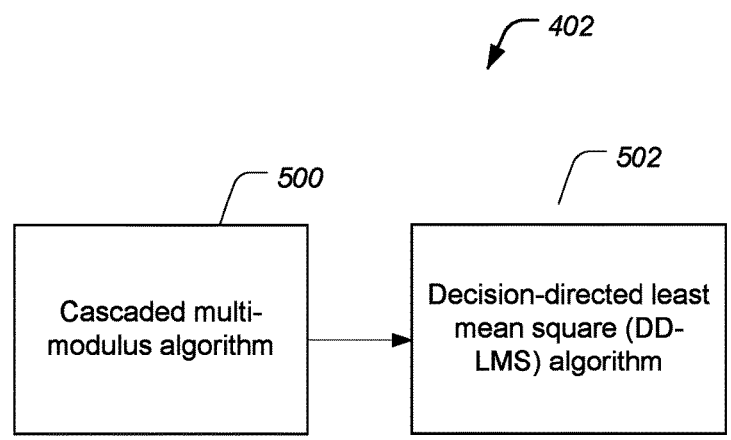
FIG. 7 illustrates an example two-step equalization algorithm.

FIG. 7 illustrates an example two-step equalization algorithm 402. In an implementation, the two-step equalization algorithm 402 includes a cascaded multi-modulus algorithm (CMMA) 500 and a decision directed least mean square (DD-LMS) algorithm 502 to accomplish better BER performance. The CMMA is used to converge the error to the acceptable range of DD-LMS, and the DD-LMS is used to further reduce the error. Specifically, the CMMA is an equalization algorithm that uses cascaded multiple modulus in performing an error signal calculation. In an implementation, the CMMA utilizes two reference circles with modulus of $(R1^P+R2^P)/2$ and $(R1^P-R2^P)^q/2^q$ in a cascaded way such that the final error signal will approach zero. Here, R1 and R2 denote the radiuses of the two circles where the PS PAM-16 constellation points locate, and p and q are two order numbers. The detailed probability of each constellation can be expressed as:

$$\varepsilon_1 = |Z|^p - \frac{R1^P + R2^P}{2} \quad \text{Eq. (2)}$$

$$\varepsilon_2 = |\varepsilon_1|^q - \left(\frac{R1^P - R2^P}{2}\right)^q \quad \text{Eq. (3)}$$

where Z denotes the ideal signal, $\varepsilon_1$ denotes an intermediate error, $\varepsilon_2$ denotes the final error, and p=2 is widely used order.

In order to decrease the residual error as much as possible, CMMA with two reference radiuses (e.g., the highest and lowest amplitude) is used for 6 iterations and the step factor is set to 0.0001. Here, CMMA algorithm is used as a pre-convergence, which can converge the error to the acceptable range of DD-LMS within which the constellation or eye diagram appears to be clear or open enough. In order to be determined as being within the acceptable range of DD-LMS, for example, the final error $\varepsilon2$ after CMMA should be smaller than $R_{max}/\sqrt{10^{SNR/10}}$ (where $R_{max}$ is the radius of the maximal circle of the noisy constellation of the signal that can be corrected by DD-LMS, and SNR is the signal to noise ratio of the signal being equalized by DD-LMS).

Subsequently, DD-LMS algorithm with a step factor of 0.0005 is used for 12 iterations, by which the error can be further reduced.

The DD-LMS may include an equalization algorithm configured based on stochastic gradient descent. The DD-LMS is used to eliminate phase noises and converge constellation points. For example, the DD-LMS algorithm may include a filtering procedure that compares actual constellation points with desired constellation points and an adjustment procedure that iteratively adjusts parameters of the filtering procedure in accordance with the comparison result.

Figure 8:
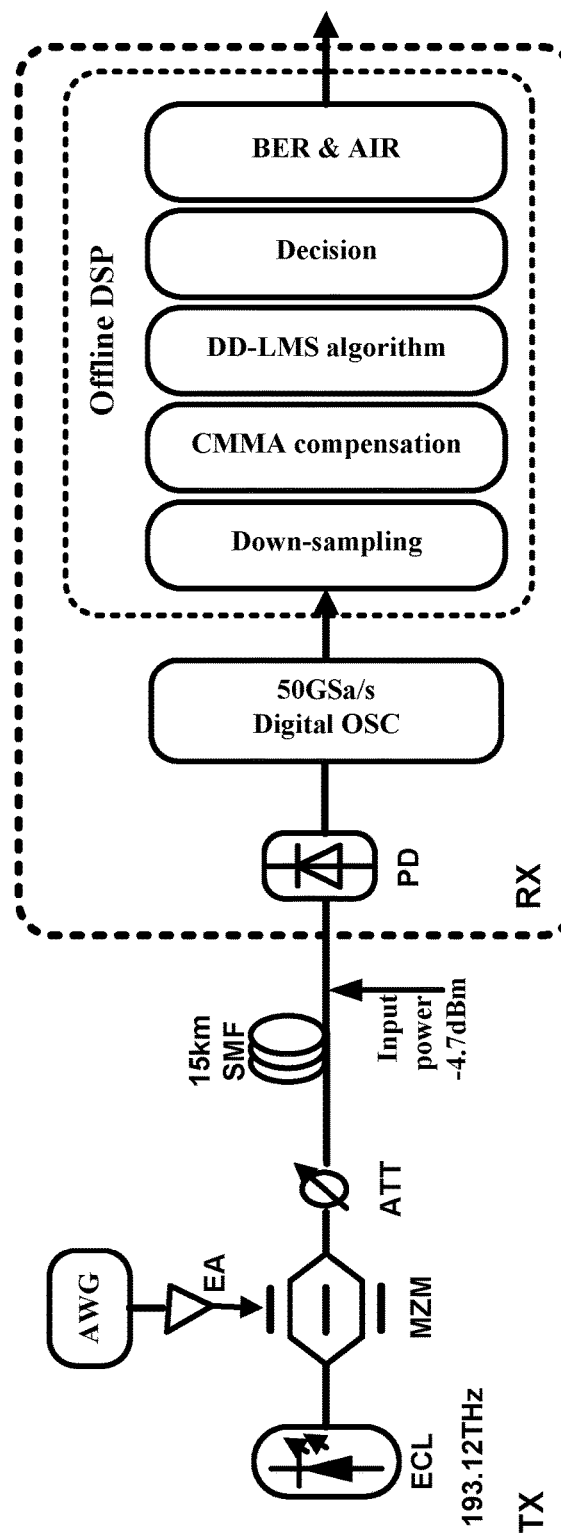
FIG. 8 illustrates an example configuration of the optical communication network.

FIG. 8 illustrates an example configuration of the optical communication network employing probabilistically shaped PAM-16 IM-DD optical transmission at the transmitter side and CMMA and DD-LMS equalization schemes at the receiver side. At the transmitter side, a continuous-wave light wave at 193.1080 THz is generated from an external cavity laser ECL. While the light wave is passing through a Mach-Zehnder modulator MZM, it is modulated by a 2~7 Gbaud electrical PS PAM-16 signal, and then converted from digital to analog by an Arbitrary Waveform Generator AWG, which has a maximal sampling rate of 12 GSa/s and 3 dB bandwidth of 3.6 GHz. The bandwidth of the Mach-Zehnder modulator MZM is 40 GHz, and the driving voltage on the Mach-Zehnder modulator MZM is 2.009V peak-to-peak. After an attenuator ATT, the PS PAM-16 optical signal is launched into a SMF-28 fiber with a launch optical power of around −2.1 dBm. After transmission over 15 km fiber, photo-detectors PD with a 3 dB bandwidth of 15 GHz receives the optical signal with an input optical power of −4.7 dBm and converts it into an electrical signal. In some implementations, an oscilloscope OSC with 33 GHz bandwidth converts the electrical signals into digital signals with the sample rate of 50 GSa/s. The resulting digital signals are processed by digital signal processing circuitry (for experiments, an offline DSP may be used). The DSP performs down-sampling, cascaded multi-modulus algorithm (CMMA) equalization with 11 taps, decision-directed least mean square (DD-LMS) algorithm with 99 taps, decision, PAM-16 demodulation, and BER and AIR counting. The CMMA equalization with two reference radiuses is performed for 6 iterations and the step factor is set to 0.0001, and the DD-LMS algorithm with a step factor of 0.0005 is performed for 12 iterations.

FIGS. 9A-9D illustrate example signal constellations at 3G and 7G baud-rate obtained after performing some DSP steps. The digital signal processing circuitry DSP with both CMMA and DD-LMS algorithm offers better constellation result compared to that without CMMA and DD-LMS algorithm or compared to that with only CMMA. FIG. 9A shows the signal constellation of a 7 Gbaud signal after DD-LMS. FIG. 9B shows the signal constellation of a received signal without CMMA and DD-LMS processing at the receiver. FIG. 9C shows the received 3 Gbaud signal after processing through CMMA. FIG. 9D shows the received 3 Gbaud signal after processing through both the CMMA and DD-LMS stages.

Figure 10:
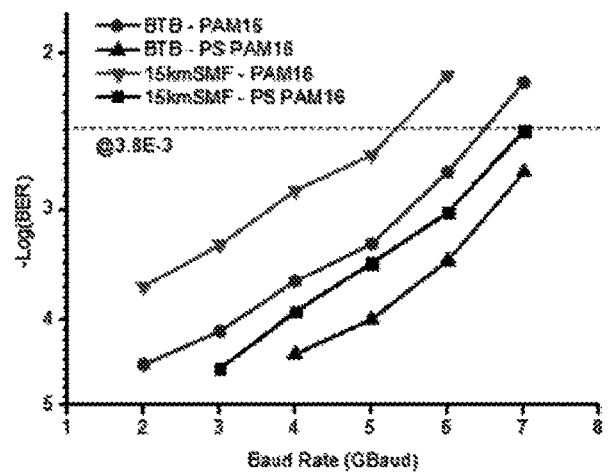
FIG. 10 illustrates examples of measured BER versus baud rate of uniform and PS PAM-16 signals under BTB case and after 15 km fiber transmission.

FIG. 10 illustrates examples of measured BER versus baud rate of uniform and PS PAM-16 signals after a back-to-back (BTB) transmission and after 15 km fiber transmission. PS PAM-16 was experimentally compared with uniform PAM-16 at different baud rate. For every baud-rate, the BER of PS signals perform better than uniform ones. Especially, the BER of PS PAM-16 signals after 15 km fiber transmission are better than uniform PAM-16 in the BTB case. FIGS. 11A-11D illustrate corresponding example constellations at 5 Gbaud-rate. In particular, FIG. 11A shows signal constellation of a received PAM-16 5 GHz signal with uniform PAM, after back to back processing. FIG. 11B shows signal constellation of a PAM-16 PS signal at 5 Gbaud, after back to back processing. FIG. 11C shows received signals for a 5 Gbaud signal with PAM 16 modulation that has travelled over a 15 Km optical link. FIG. 11D shows a received 5 Gbaud signal after 15 Km, transmitted as a PS PAM-16 signal.

Figure 12:
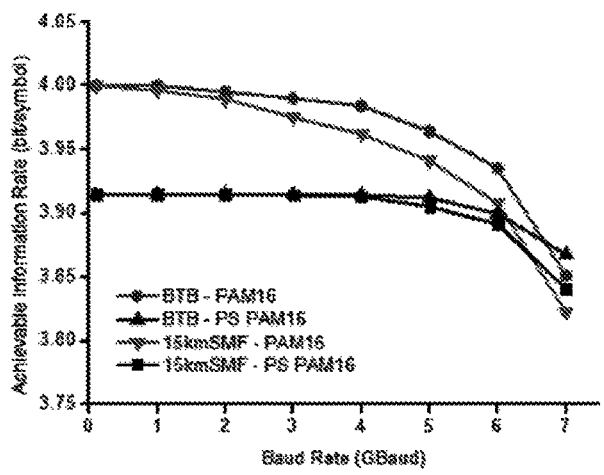
FIG. 12 illustrates examples of measured AIR versus baud rate of uniform and PS PAM-16 signals under BTB case and after 15 km fiber transmission.

FIG. 12 illustrates examples of measured AIR versus baud rate of uniform and PS PAM-16 signals in the BTB case and after 15 km fiber transmission. Regardless of whether PS PAM-16 signals are transmitted in the BTB case or in the 15 km-fiber case, AIR of uniform PAM-16 is higher than PS PAM-16 before 6 Gbaud-rate. However, the gap narrows gradually and AIR of PS PAM-16 overtakes the uniform PAM-16 when the baud-rate reaches 7 Gbaud. After 15 km fiber transmission, AIR of PS PAM-16 (3.85 bit/symbol) at 7 Gbaud-rate is 0.03 bit/symbol higher than uniform PAM-16 (3.82 bit/symbol). Obviously, AIR of PS PAM-16 drops more slowly than the uniform PAM-16 with the improvement of baud-rate. Thus, when the baud-rate reaches or even when it exceeds 7 Gbaud, PS PAM-16 can be a more reliable modulation scheme compared with PAM-16.

In performing 5 Gbaud PAM-16 and 7 Gbaud PAM-16 IM-DD optical transmission over 15-km fiber, PS PAM-16 modulation format can also offer satisfactory reliable performance on the basis of improving the spectral efficiency. It has been confirmed that the achievable maximal transmission bit rate for PS PAM-16 (27.4 Gbit/s) is larger than uniform PAM-16 (20 Gbit/s). Despite of its relatively small degree of shaping, the PS PAM-16 has a better transmission capacity compared to the uniform PAM-16. On the other hand, the original AIR of the PS PAM-16 signal is a little lower than the uniform PAM-16, but the AIR of PS PAM-16 drops more slowly and goes beyond the uniform PAM-16 gradually with the improvement of baud-rate. Therefore, it can be concluded that PS PAM-16 brings a better balance between effectiveness and reliability performance than the uniform PAM-16.

Figure 13:
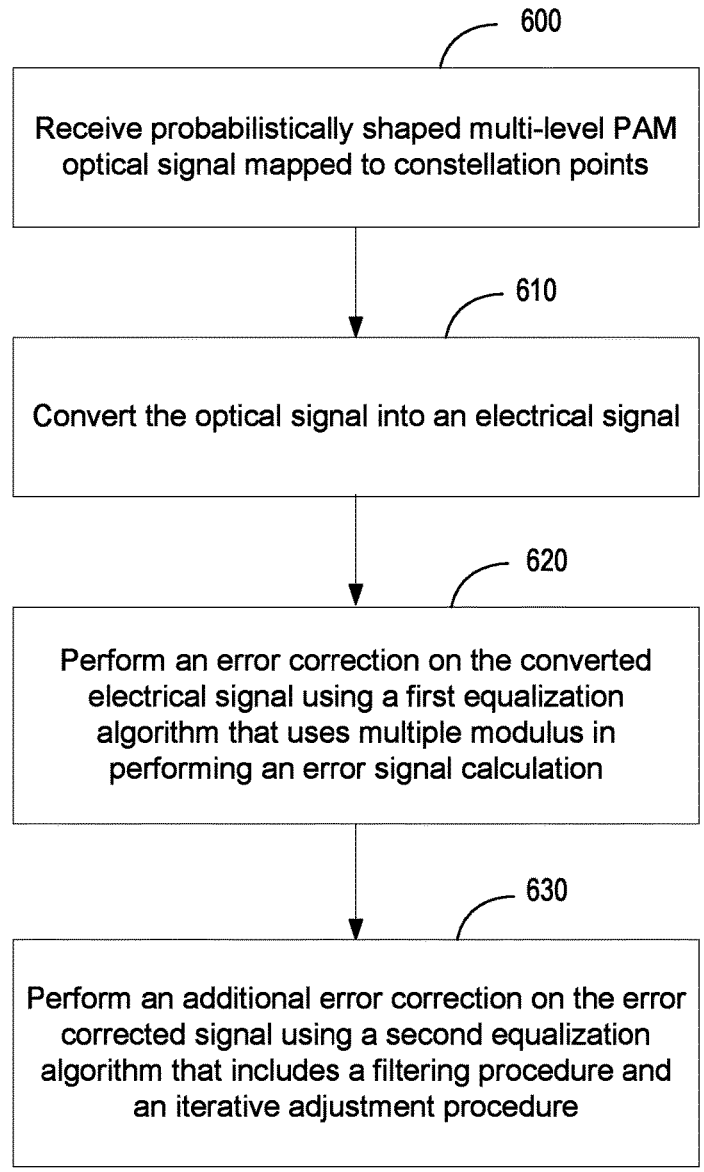
FIG. 13 is a flow chart representation of an example optical communication method.

FIG. 13 is a flow chart representation of an example optical communication method including various steps 600, 610, 620, and 630. When information bits, which are produced in a form of an optical multi-level pulse amplitude modulation signal using a probabilistic shaping scheme, are transmitted to a receiver side, an optical receiver apparatus receives the probabilistically shaped (PS), multi-level pulse amplitude modulation (PAM) signals mapped to constellation points at the step 600. The received optical signal is converted into an electrical signal at the step 610. The electrical signal is processed using a two-step equalization algorithm converging actual constellation points into desired constellation points. At the step 620, a first equalization algorithm is performed by using multiple modulus in performing an error signal calculation. At the step 630, a second equalization algorithm is performed. The second equalization algorithm includes a filtering procedure that compares actual constellation points with desired constellation points and an adjustment procedure that iteratively adjusts parameters of the filtering procedure in accordance with the comparison result.

Figure 14:
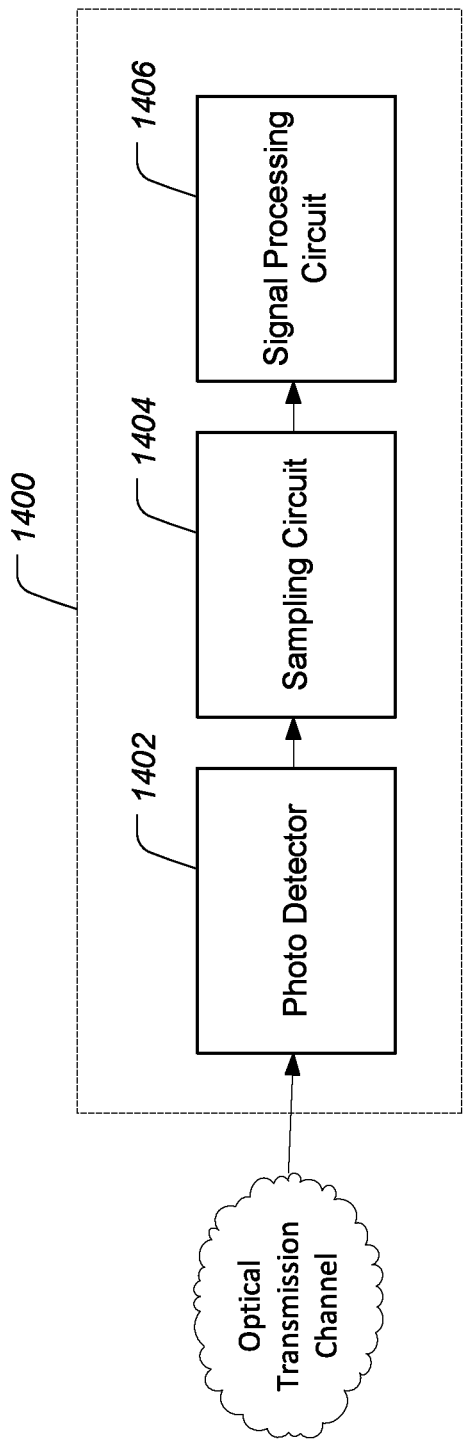
FIG. 14 illustrates an example of an optical communication apparatus.

FIG. 14 illustrates an example of an optical communication apparatus. In some implementations, an optical receiver apparatus 1400 includes a photo detector 1402 that detects amplitude modified optical signals transmitted through an optical transmission channel and mapped to constellation points and converts the optical signal into electrical signals, a sampling circuit 1404 that samples the electrical signals and generates digital signals, and a signal processing circuit 1406 that has a two-step equalization algorithm converging actual constellation points into desired constellation points. The two-step equalization algorithm includes a first equalization algorithm that uses multiple modulus in performing an error signal calculation, and a second equalization algorithm that includes a filtering procedure that compares actual constellation points in a signal resulting from the first equalization algorithm with desired constellation points and an adjustment procedure that iteratively adjusts parameters of the filtering procedure in accordance with the comparison result. The desired constellation points may be PAM levels known a priori to the receiver as being used by the transmitter.

As discussed in this document, the spectral efficiency of optical systems can be improved by using probabilistic shaping in the multi-level pulse amplitude modulation. In another advantageous aspect, the transmitted signal received at the receiver side can be processed using constant multi-modulus adaptive equalization algorithm (CMMA) and decision-directed least mean square (DD-LMS) algorithm, thereby improving the overall performance of optical systems.

The disclosed and other embodiments, algorithms, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "signal processing circuit" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

In implementing the equalization algorithm discussed in this document, a computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. An optical receiver apparatus, comprising:
a photo detector that detects amplitude modified optical signals transmitted through an optical transmission channel and mapped to constellation points and converts the optical signal into electrical signals;
a sampling circuit that samples the electrical signals and generates digital signals; and
a signal processing circuit that has a two-step equalization algorithm converging actual constellation points into desired constellation points, the two-step equalization algorithm comprising:
a first equalization algorithm that uses multiple modulus in performing an error signal calculation; and
a second equalization algorithm that includes a filtering procedure that compares actual constellation points in an intermediate signal resulting from the first equalization algorithm with desired constellation points and an adjustment procedure that iteratively adjusts parameters of the filtering procedure in accordance with the comparison result,
wherein the first equalization algorithm includes a cascaded multi-modulus algorithm that utilizes at least two reference circles in a cascaded way, and wherein the at least two reference circles include reference circles that have reference radiuses corresponding to the highest and lowest amplitudes of the amplitude modified optical signal.

2. The apparatus of claim 1, wherein the amplitude modified optical signals include optical signals that are modulated using a 16-level pulse amplitude modulation scheme with probabilistic shaping.

3. The apparatus of claim 1, wherein the first equalization algorithm includes a cascaded multi-modulus algorithm that converges errors in the constellation points to a range of correction of the second equalization algorithm.

4. The apparatus of claim 1, wherein the second equalization algorithm includes a decision directed least mean square algorithm that further reduces the errors.

5. An optical communication system, comprising:
a light source that generates a light wave as an optical carrier wave, at a transmitter side;
a modulation signal generator that processes information bits to be transferred in a form of an optical multi-level pulse amplitude modulation signal using a probabilistic shaping scheme, at the transmitter side;
an optical signal receiving circuit that detects the optical multi-level pulse amplitude modulation signal mapped to constellation points and converts the optical signal into electrical signals, at a receiver side; and
a signal processing circuit that has a two-step equalization algorithm converging actual constellation points into desired constellation points, at the receiver side, the two-step equalization algorithm comprising:
a first equalization algorithm that uses multiple modulus in performing an error signal calculation; and
a second equalization algorithm that includes a filtering procedure that compares actual constellation points in an intermediate signal resulting from the first equalization algorithm with desired constellation points and an adjustment procedure that iteratively adjusts parameters of the filtering procedure in accordance with the comparison result,
wherein the first equalization algorithm includes a cascaded multi-modulus algorithm that utilizes at least two reference circles in a cascaded way, and wherein the at least two reference circles include reference circles that have reference radiuses corresponding to the highest and lowest amplitudes of the amplitude modified optical signal.

6. The system of claim 5, wherein the light source includes an external cavity laser to input an optical carrier signal to the modulation signal generator.

7. The system of claim 5, wherein the modulation signal generator includes a Mach-Zehnder modulator (MZM).

8. The system of claim 5, wherein the optical multi-level pulse amplitude modulation signal has 16 or higher amplitude levels.

9. The system of claim 5, wherein the optical signal receiving circuit includes a photo detector that detects the optical signal and converts the optical signal into electrical analog signals.

10. The system of claim 9, wherein the optical signal receiving circuit includes a downsampling circuit that generates the electrical signals by downsampling from transmission baud rate to a baseband baud rate.

11. The system of claim 5, wherein the first equalization algorithm includes a cascaded multi-modulus algorithm that converges errors in the constellation points to an acceptable range of the second equalization algorithm.

12. The system of claim 5, wherein the second equalization algorithm includes a decision directed least mean square algorithm that further reduces the errors.

13. A method of recovering information bits from a probabilistically shaped (PS), multi-level pulse amplitude modulation (PAM) optical signals, comprising:
receiving the PS multi-level PAM optical signal mapped to constellation points;
converting the optical signal into an electrical signal; and
processing the converted electrical signal using a two-step equalization algorithm converging actual constellation points into desired constellation points, at the receiver side, the two-step equalization algorithm comprising:
a first equalization algorithm that uses multiple modulus in performing an error signal calculation; and
a second equalization algorithm that includes a filtering procedure that compares actual constellation points in an intermediate signal resulting from the first equalization algorithm with desired constellation points and an adjustment procedure that iteratively adjusts parameters of the filtering procedure in accordance with the comparison result,
wherein the first equalization algorithm includes a cascaded multi-modulus algorithm that utilizes at least two reference circles in a cascaded way, and wherein the at least two reference circles include reference circles that have reference radiuses corresponding to the highest and lowest amplitudes of the amplitude modified optical signal.

14. The method of claim 13, wherein the two-step equalization algorithm includes a decision-directed least mean square (DD-LMS) algorithm having a filtering procedure that compares actual constellation points with desired constellation points and an adjustment procedure that iteratively adjusts parameters of the filtering procedure in accordance with the comparison result.

15. The method of claim 13, further comprising obtaining a bit-error ratio (BER) and an achievable information rate (AIR) after performing the two-step equalization algorithm.

16. The method of claim 15, further comprising, after performing the two-step equalization algorithm, performing a decision procedure based on the results of the two-step equalization algorithm.

17. The method of claim 13, further comprising performing a down sampling before performing the equalization algorithms.

* * * * *